(12) United States Patent
Hashimoto

(10) Patent No.: US 8,855,818 B2
(45) Date of Patent: Oct. 7, 2014

(54) MONITORING APPARATUS FOR ROBOT

(75) Inventor: Yasuhiko Hashimoto, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 815 days.

(21) Appl. No.: 13/062,426

(22) PCT Filed: Sep. 30, 2008

(86) PCT No.: PCT/JP2008/068126
§ 371 (c)(1),
(2), (4) Date: Mar. 4, 2011

(87) PCT Pub. No.: WO2010/038315
PCT Pub. Date: Apr. 8, 2010

(65) Prior Publication Data
US 2011/0166704 A1    Jul. 7, 2011

(51) Int. Cl.
| | | |
|---|---|---|
| G05B 19/18 | (2006.01) |
| B66C 1/02 | (2006.01) |
| B25J 15/06 | (2006.01) |
| B65G 47/91 | (2006.01) |
| B25J 15/00 | (2006.01) |
| B25J 13/08 | (2006.01) |

(52) U.S. Cl.
CPC ........... B25J 15/0616 (2013.01); B66C 1/0243 (2013.01); B66C 1/0218 (2013.01); B65G 47/918 (2013.01); B25J 15/0052 (2013.01); B25J 13/087 (2013.01); B65G 47/917 (2013.01)
USPC .......................................... 700/250; 700/245

(58) Field of Classification Search
CPC .. B25J 13/087; B25J 15/0052; B25J 15/0616; B65G 47/917; B65G 47/918; B66C 1/0218; B66C 1/0243

USPC ............................... 700/245–264; 901/10, 40
See application file for complete search history.

(56) References Cited

U.S. PATENT DOCUMENTS 4,921,396 A  *  5/1990  Asakawa et al. ........... 414/751.1
6,187,132 B1     2/2001  Iwasaki et al.
(Continued)

FOREIGN PATENT DOCUMENTS

| EP | 0 104 871 A2 | 4/1984 |
| JP | A-61-214988 | 9/1986 |

(Continued)

OTHER PUBLICATIONS

Sep. 18, 2012 Search Report issued in Taiwanese Application No. 098132717 (with translation).

(Continued)

*Primary Examiner* — Jason Holloway
*Assistant Examiner* — Rachid Bendidi
(74) *Attorney, Agent, or Firm* — Oliff PLC

(57) ABSTRACT

The invention is a monitoring apparatus for monitoring a condition of an end-effector of a robot having a vacuum absorption pad to hold an article. The pad is elastically supported by the end-effector. The apparatus includes a pad receiving part having a front surface and a through hole, the pad receiving part being movable in a direction perpendicular to the front surface; an elastically supporting unit for elastically supporting the pad receiving part in a direction perpendicular to the front surface; a movement detection unit for detecting a movement of the pad receiving part; a vacuum sensor connected to the through hole; and a judging unit for judging conditions of an elastic support of the pad and a vacuum absorption of the pad based on detection results of the movement detection unit and the vacuum sensor.

9 Claims, 4 Drawing Sheets

(56) References Cited

U.S. PATENT DOCUMENTS

| | | | |
|---|---|---|---|
| 6,508,268 B1 | 1/2003 | Kouketsu | |
| 2002/0131853 A1* | 9/2002 | Nagasawa | 414/627 |
| 2005/0137751 A1* | 6/2005 | Cox et al. | 700/245 |
| 2006/0033065 A1 | 2/2006 | Duelli et al. | |
| 2008/0199283 A1* | 8/2008 | Mitsuyoshi | 414/222.01 |
| 2009/0114052 A1* | 5/2009 | Haniya et al. | 74/490.03 |

FOREIGN PATENT DOCUMENTS

| | | |
|---|---|---|
| JP | A-62-102985 | 5/1987 |
| JP | A-4-87788 | 3/1992 |
| JP | A-5-47898 | 2/1993 |
| JP | A-10-256345 | 9/1998 |
| JP | A-2000-159472 | 6/2000 |
| TW | 468016 B | 12/2001 |

OTHER PUBLICATIONS

Extended European Search Report issued in European Application No. 08811412.9 dated Mar. 27, 2013.
International Search Report for International Patent Application No. PCT/JP2008/068126, mailed on Dec. 16, 2008.
Written Opinion for International Patent Application No. PCT/JP2008/068126, mailed on Dec. 16, 2008.

* cited by examiner

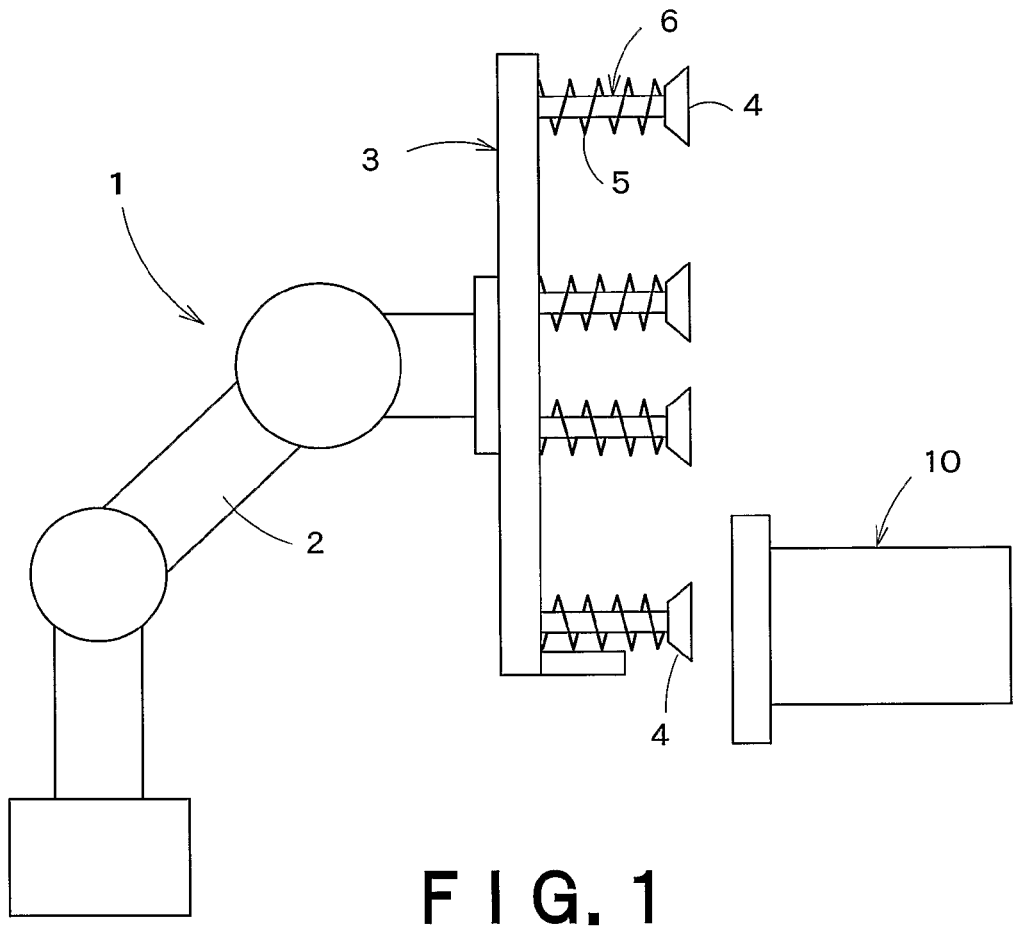
F I G. 1
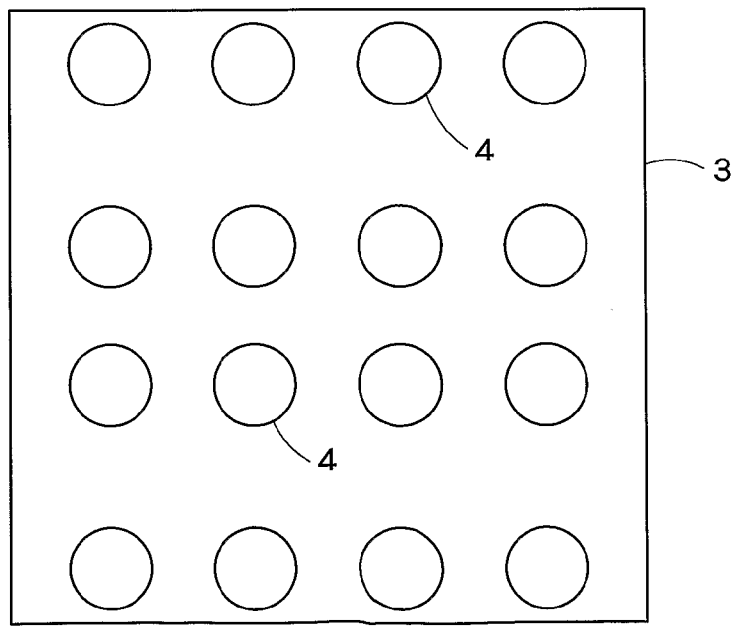
F I G. 2

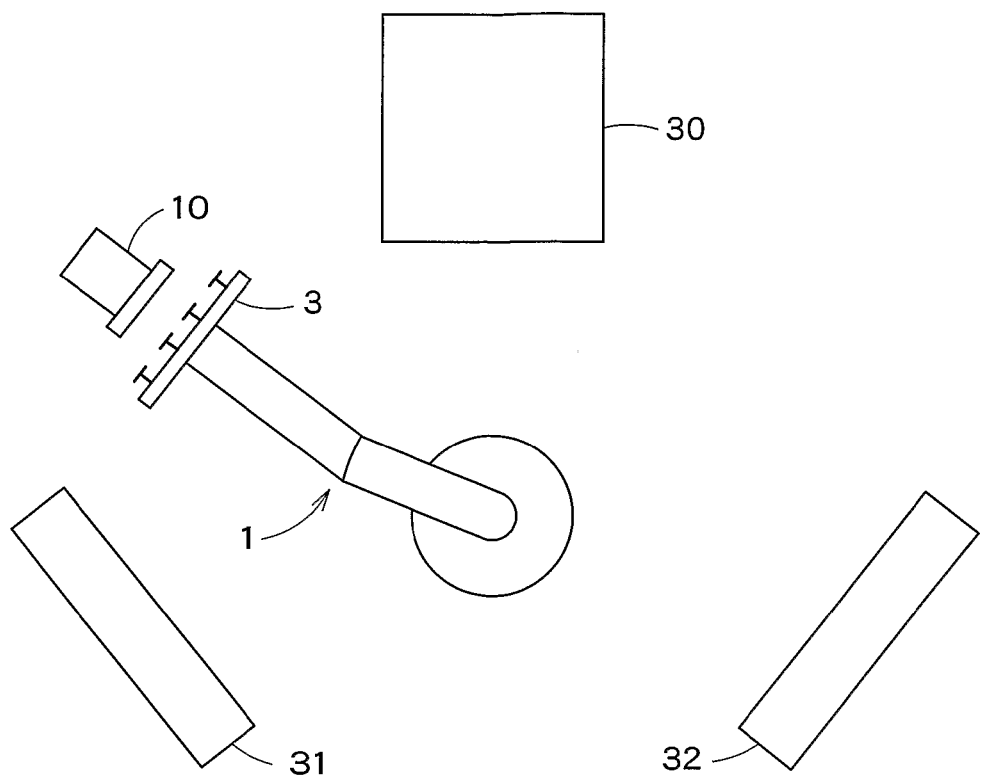
F I G. 4
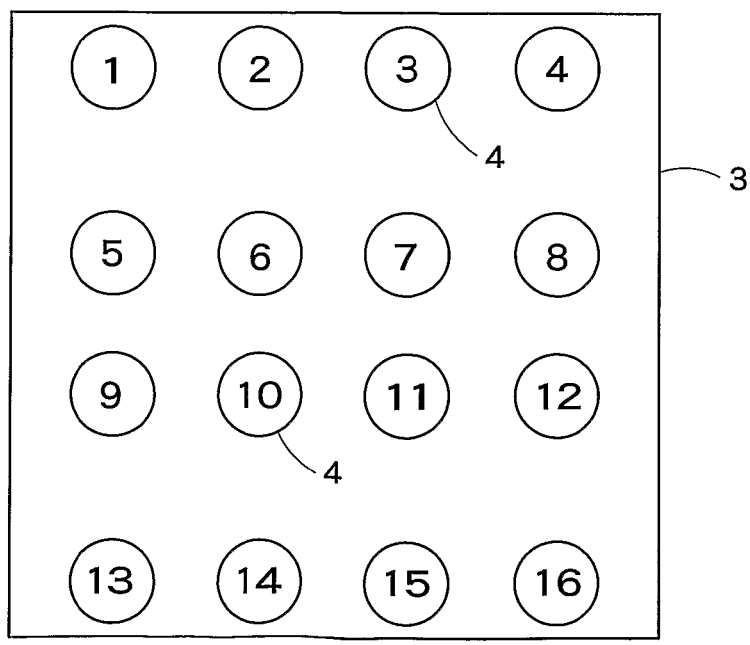
F I G. 5

MONITORING APPARATUS FOR ROBOT

TECHNICAL FIELD

The present invention relates to a monitoring apparatus for monitoring a condition of an end-effector of a robot. The end-effector has a vacuum absorption pad which is elastically supported by the end-effector to hold an article.

Particularly, the monitoring apparatus of the present invention is suitable for monitoring a condition of an end-effector of a transfer robot which is used for transferring a large size glass substrate used for a solar panel.

BACKGROUND ART

There is a conventional robot which has an end-effector with a vacuum absorption pad. This conventional robot holds an article by using an absorbing force of the vacuum absorption pad and transfers the article held by the vacuum absorption pad.

In a case that an article has a small size and a light weight, a single vacuum absorption pad may be enough to hold the article and transfer the same.

On the other hand, when an article has a large size, an end-effector may be provided with a plurality of vacuum absorption pads so that the article is absorbed by all of the vacuum absorption pads.

For example, a rectangular glass substrate used for a solar panel has a side of more than two meters so as to have a large size and a heavy weight. When transferring such a large and heavy substrate, the end-effector is provided with 15 to 20 vacuum absorption pads.

The end-effector may be provided with a floating mechanism to elastically support the vacuum absorption pad so that an article can be surely held by the vacuum absorption pad with its absorbing force.

A related art is disclosed in JP 61-214988A, JP 62-102985A, and JP 5-47898A.

In such a robot for transferring an article held by the vacuum absorption pads, when the vacuum absorption pads have become unable to achieve a normal vacuum absorbing force due to a damage or aging thereof, such deteriorated vacuum absorption pads have to be replaced with new ones.

Particularly, a glass substrate may already have a crack prior to being transferred by a transfer robot. In this situation, when a vacuum pad of the robot is pressed against the crack, the pad may be cut by the edge of the crack.

Moreover, if a glass substrate has been broken, fragments of the broken glass may attach to a floating mechanism of a vacuum absorption pad so that the back-and-forth movements of the vacuum absorption pad may be deteriorated by the fragments.

It is considered to provide each of a plurality of vacuum absorption pads with a vacuum sensor in order to check the vacuum absorbing force of each of the vacuum absorption pads. In this case, the pressure or vacuum level within each vacuum absorption pad can be detected by each vacuum sensor in the state that an article is absorbed and held by the vacuum absorption pads.

However, the vacuum sensors mounted on the vacuum absorption pads are susceptible to be damaged due to shocks which would be caused when an article is held by absorption and transferred.

Moreover, when all of the vacuum absorption pads are provided with the vacuum sensors, it is likely to unnecessarily stop the transfer robot due to erroneous operations of the vacuum sensors so that the productivity may be made even worse.

Further, dairy inspections of a plurality of vacuum absorption pads require a large amount of work load. Accordingly, it is desired to provide a monitoring apparatus that can easily and surely detect conditions of vacuum absorption pads.

Particularly, it is desired to provide a monitoring apparatus that can detect not only abnormal conditions of vacuum absorption forces of vacuum absorption pads, but also abnormal conditions of elastic supporting abilities by floating mechanisms for vacuum absorption pads.

For a transfer robot having a plurality of vacuum absorption pads on an end-effector, even when some of the vacuum absorption pads malfunction, the robot may be able to safely hold an article and transfer the same with the remaining normal vacuum absorption pads.

Therefore, it is desired to provide a monitoring apparatus that can precisely detect the point of time when the robot has become to be unable to safely transfer an article.

DISCLOSURE OF INVENTION

The present invention has been made in view of the above mentioned situations to provide a monitoring apparatus that can easily and surely detect a condition of an end-effector of a robot.

Moreover, the present invention has been made in order to provide a monitoring apparatus that can detect not only an abnormal condition of a vacuum absorption force of a vacuum absorption pad, but also an abnormal condition of an elastic supporting ability by a floating mechanism for a vacuum absorption pad.

Further, the present invention has been made in order to provide a monitoring apparatus that can precisely detect the point of time when a transfer robot, which has a plurality of vacuum absorption pads on its end-effector, has become to be unable to safely transfer an article due to a deterioration of the end-effector.

The present invention is a monitoring apparatus for monitoring a condition of an end-effector of a robot, the robot including a vacuum absorption pad to hold an article, the pad being configured to be elastically supported by the end-effector, comprising:

a pad receiving part having a front surface and a through hole, the pad receiving part being configured to be movable in a direction perpendicular to the front surface;

an elastically supporting unit configured to elastically support the pad receiving part in a direction perpendicular to the front surface;

a movement detection unit configured to detect a movement of the pad receiving part;

a vacuum sensor connected to the through hole; and a judging unit configured to judge a condition of an elastic support of the pad and a condition of a vacuum absorption of the pad based on a detection result of the movement detection unit and a detection result of the vacuum sensor.

Preferably, the movement detection unit is configured to generate a detection signal when an amount of the movement of the pad receiving part has reached a given value in a state that the vacuum absorption pad is pressed against the front surface.

Preferably, the movement detection unit includes a proximity sensor which is disposed opposite to a reference member to be detected by the proximity sensor, the reference member being configured to move together with the pad receiving part toward the proximity sensor.

Preferably, the elastically supporting unit is configured to elastically support the pad receiving part with an elastically supporting force which is greater than an elastically supporting force for supporting the vacuum absorption pad in the end-effector.

Preferably, the elastically supporting unit comprises a liner guide configured to support the pad receiving part so that the pad receiving part can move in back-and-forth directions, and a compressing spring configured to press a movable member, to which the pad receiving part is attached, of the liner guide in a direction perpendicular to the front surface.

Preferably, the robot includes a plurality of vacuum absorption pads, and the monitoring apparatus further comprises a memory unit in which judgment results by the judging unit are stored together with an information for identifying respective vacuum absorption pads.

Preferably, the judging unit is configured to judge based on the judgment results stored in the memory unit whether an abnormal condition of the plurality of vacuum absorption pads satisfies a given condition.

Preferably, the given condition includes a condition corresponding to a serious abnormal state in which the article can not be transferred, and a condition corresponding to a non-serious abnormal state in which the article can be transferred but under a transferring speed lower than a normal transferring speed.

Preferably, the monitoring apparatus further comprises a fluid ejecting unit configured to eject a compressed fluid toward the end-effector.

One aspect of the present invention is a monitoring apparatus for monitoring a condition of an end-effector of a transfer robot, the transfer robot including a plurality of vacuum absorption pads which are elastically supported by the end-effector, an article being absorbed and held by the vacuum absorption pads of the end-effector so as to be transferred by the transfer robot, comprising:

a pad receiving part having a front surface against which the vacuum absorption pad is pressed, the pad receiving part being configured to be movable in a pressing direction of the vacuum absorption pad;

an elastically supporting unit configured to elastically support the pad receiving part in a direction opposite to the pressing direction of the vacuum absorption pad;

a movement detection unit configured to detect a movement of the pad receiving part when the vacuum absorption pad is pressed against the front surface of the pad receiving part;

a vacuum sensor configured to detect a vacuum condition inside the vacuum absorption pad which has been brought into contact with the front surface of the pad receiving part; and a judging unit configured to judge based on a detection result of the movement detection unit whether the vacuum absorption pad is elastically supported in a normal condition and also judge based on a detection result of the vacuum sensor whether the vacuum absorption pad can achieve a normal vacuum condition.

BRIEF DESCRIPTION OF DRAWINGS

FIG. 1 is a side view of a transfer robot which is monitored by a monitoring apparatus according to an embodiment of the present invention, together with the monitoring apparatus.

FIG. 2 is a schematic front view an end-effector of the transfer robot shown in FIG. 1.

FIG. 3 is a view for explaining the operation of the monitoring apparatus according to the present embodiment, in which FIG. 3(A) shows a waiting state, FIG. 3(B) shows a contacting state, and FIG. 3(C) shows a pressing state.

FIG. 4 is a plan view showing an arrangement in which the monitoring apparatus according to the present embodiment is disposed besides the transfer robot.

FIG. 5 is a drawing for explaining identification numbers which are respectively addressed to vacuum absorption pads of the end-effector of the transfer robot.

BEST MODE FOR CARRYING OUT THE INVENTION

Figure 3:
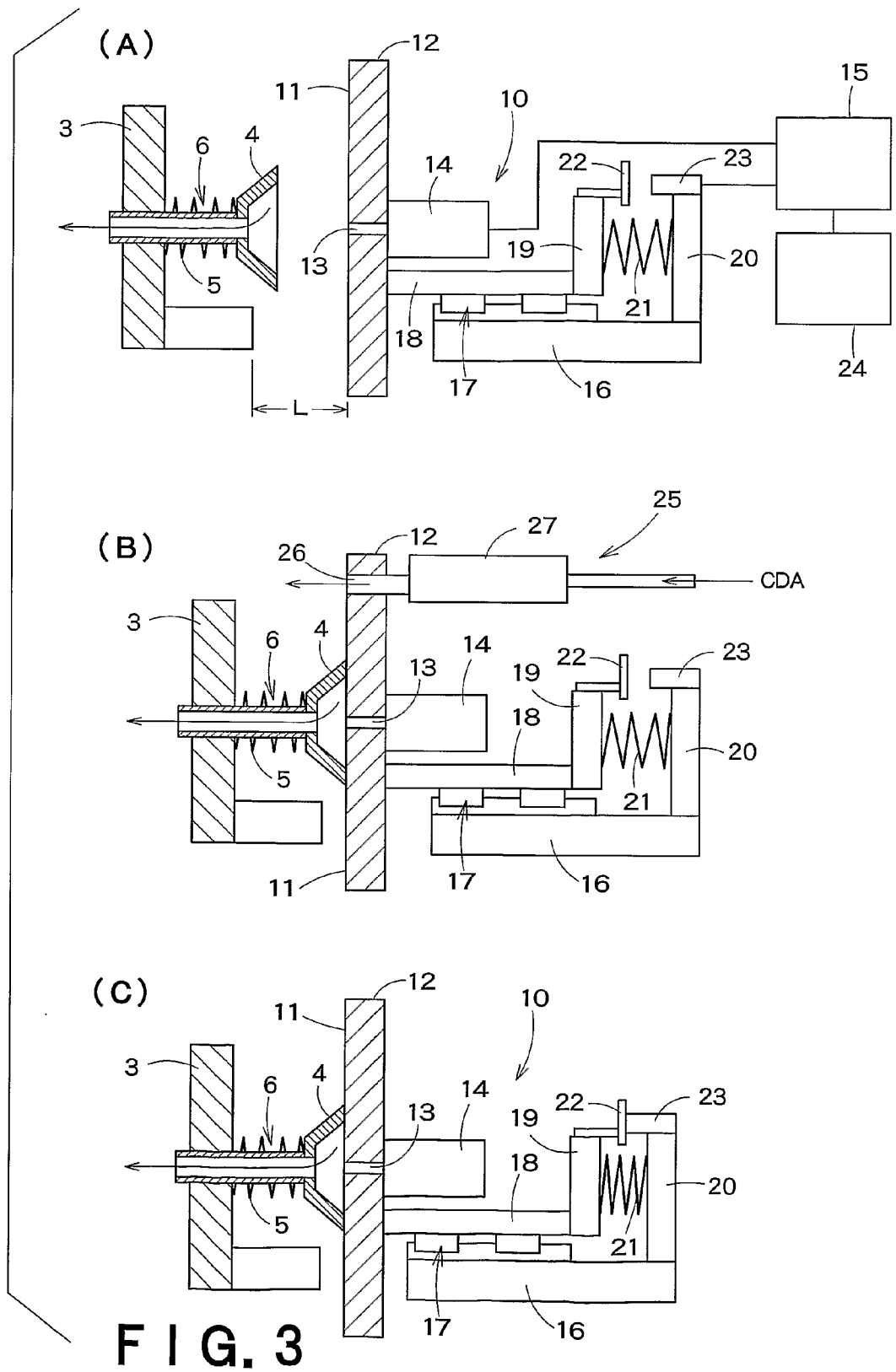

The monitoring apparatus for monitoring the condition of the end-effector of the transfer robot according to the embodiment of the present invention will be explained with reference to the drawings.

As shown in FIG. 1, the transfer robot 1 has the end-effector 3 which is attached to the distal end of an arm 2 of the robot 1. This transfer robot 1 is suitable for transferring a substrate, especially a large glass substrate such as a glass substrate for a solar panel.

The end-effector 3 is provided with a plurality of vacuum absorption pads 4, which are arranged in four rows and four columns as shown in FIG. 2. Each of the vacuum absorption pads 4 is elastically supported by each of floating mechanisms 6. The floating mechanisms 6 respectively have buffer springs 5 so that each of the vacuum absorption pads 4 can move in back-and-forth directions.

The vacuum absorption pads 4 are connected to a compressed air source (not shown) which supplies a clean dry air (CDA). Moreover, each of the vacuum absorption pads 4 is provided with each vacuum ejector (not shown), e.g., Venturi. Thereby, an inside of each pad 4 can be exhausted by each vacuum ejector which is disposed for each pad 4.

According to the end-effector 3 having such constitution, even when one or several vacuum absorption pads 4 have been damaged so as to lose their abilities to achieve normal vacuum conditions, the remaining vacuum absorption pads 4 do not lose their abilities to achieve their normal vacuum conditions.

Therefore, even when one or several vacuum absorption pads 4 have been damaged by, for example, cracks of glass substrates, the remaining normal vacuum absorption pads 4 can absorb and hold a glass substrate so as to prevent the glass substrate from dropping due to a slip.

However, when the number of the damaged vacuum absorption pads 4 has further increased, it would become impossible for the remaining normal pads 4 to absorb and hold the glass substrate.

The back-and-forth movements of the vacuum absorption pads 4 may be deteriorated when fragments of a broken glass have attached to the floating mechanisms 6. Accordingly, this kind of malfunction also needs to be detected.

Therefore, the monitoring apparatus 10 according the present embodiment is used to detect the conditions of a plurality of vacuum absorption, pads 4 and the floating mechanisms 6 in order to surely prevent glass substrates from dropping due to slip during their transportations.

As shown in FIG. 3, the monitoring apparatus 10 has a pad receiving part 12 including a front surface 11 against which each vacuum absorption pad 4 is pressed.

A through hole 13 is formed in the central portion of the pad receiving part 12 so as to extend from the front surface 11 to the rear surface thereof. The through hole 13 is connected to a vacuum sensor 14 at its rear end.

The vacuum sensor 14 is connected to a judging unit 15 via a signal line so that the detection signals from the vacuum sensor 14 are transferred to the judging unit 15 via the signal line.

The pad receiving part 12 is supported by a liner guide 17 which is mounted on a base 16 so that the pad receiving part 12 can linearly move in the pressing direction of the vacuum absorption pad 4, i.e., the direction perpendicular to the front surface 11. The liner guide 17 is provided with a movable member 18 to which the pad receiving part 12 is attached at its front end.

The movable member 18 of the linear guide 17 is provided at its rear end with a movable supporting plate 19. On the other hand, the base 16 is provided at its rear end with a stationary supporting plate 20. A compression spring 21 is disposed between the movable supporting plate 19 and the stationary supporting plate 20.

The compression spring 21 elastically supports the pad receiving part 12 with an elastically supporting force which is greater than the elastically supporting force of the buffer spring 5 of the floating mechanism 6.

An elastically supporting unit is constituted by the linear guide 17, the movable member 18, the movable supporting plate 19, the stationary supporting plate 20, and the compression spring 21, so that the elastically supporting unit elastically supports the pad receiving part 12 in the direction opposite to the pressing direction of the vacuum absorption pad 4.

The movable supporting plate 19 is provided at its upper end with a reference member 22 to be detected. The stationary supporting plate 20 is provided at its upper end with a proximity sensor 23 which is opposite to the reference member 22.

The proximity sensor 23 is connected to the judging unit 15 via a signal line so that the detection signals from the proximity sensor 23 are transferred to the judging unit 15.

A movement detection unit is constituted by the reference member 22 and the proximity sensor 23 so that the movement detection unit detects the movement of the pad receiving part 12 when the vacuum absorption pad 4 is pressed against the front surface 11.

The proximity sensor 23 may be of the type that continuously measures the distance to the reference member 22, or the type that generates a detection signal when the distance to the reference member 22 has decreased to a given value, including zero.

The judging unit 15 judges whether there are any abnormal conditions of the vacuum absorption pads 4 and/or the floating mechanisms 6 based on the detection signals from the vacuum sensor 14 and the proximity sensor 23.

Then, the results of the judgments are stored in a memory unit 24 together with the information for identifying the vacuum absorption pads 4 which have been tested.

As shown in FIG. 3(B), the monitoring apparatus 10 is further provided with a fluid ejecting unit 25 for ejecting CDA toward the end-effector 3. The fluid ejecting unit 25 has an ejecting port 26 formed through the pad receiving part 12, a valve 27 communicated with the ejecting port 26, and a compressed air source (not shown) connected to the valve 27.

Next, a method of detecting an abnormal condition of the end-effector 3 of the transfer robot 1 using the monitoring apparatus 10 according to the present embodiment will be described hereunder.

As shown in FIG. 4, besides the transfer robot 1, there are a rack 30 for storing a plurality of glass substrates and solar panels 31, 32 on which glass substrates pulled out from the rack 30 by the transfer robot 1 are to be mounted.

The monitoring apparatus 10 according to the present embodiment is disposed besides the transferring route along which the glass substrate is transferred from the rack 30 to the solar panel 31.

The test of the end-effector 3 by the monitoring apparatus 10 may be conducted for a part or all of the vacuum absorption pads 4 when all of the glass substrates have been carried out from one rack 20.

Or, the test may be conducted for one or several vacuum absorption pads 4 in each returning pass after each of the glass substrates has been transferred from the rack 30 to the solar panel 31.

When conducting the test of the vacuum absorption pad 4, from the state (Waiting State) shown in FIG. 3(A) in which the end-effector 3 is spaced apart by a given distance L from the front surface 11 of the pad receiving part 12, the transfer robot 1 is driven to move forward the end-effector 3 toward the front surface 11 of the pad receiving part 12.

In this situation, the exhausting operation of the end-effector 3 is kept to be active so that air is exhausted from the inside of each vacuum absorption pads 4.

When the end-effector 3 has been moved forward toward the pad receiving part 12, the front end of the vacuum absorption pad 4 is brought into contact with the front surface 11 as shown in FIG. 3(B) (Contacting State).

In this regard, the arm 2 of the transfer robot 1 is operated so that the through hole 13 in the center of the pad receiving part 12 is covered by the vacuum absorption pad 4.

When the front end of the vacuum absorption pad 4 is brought into closely contact with the front surface 11 of the pad receiving part 12, the inside of the vacuum absorption pad 4 will be depressurized since the inside of the pad 4 is exhausted.

Then, the internal pressure of the vacuum absorption pad 4 is detected by the vacuum sensor 14, and the detection signal of the vacuum sensor 14 is transferred to the judging unit 15.

The judging unit 15 judges whether the tested vacuum absorption pad 4 performs a normal vacuum condition, based on the detection signal from the vacuum sensor 14. Namely, under the state that the front end of the vacuum absorption pad 4 is brought into closely contact with the front surface 11, it is judged whether the vacuum level in the vacuum absorption pad 4 has reached a given value.

From the state shown in FIG. 3(B), the end-effector 3 is further moved forward by a predetermined distance. Then, in the case that the floating mechanism 6 normally operates, the buffer spring 5 of the floating mechanism 6 is compressed so that the pad receiving part 12 is not moved rearward, or only slightly pressed rearward.

On the other hand, in the case that the floating mechanism 6 does not normally operate due to, e.g., attached fragments of a broken glass, when the vacuum absorption pad 4 is pressed against the front surface 11 of the pad receiving part 12, the pad receiving part 12 is moved rearward against the elastic force of the compression spring 21 of the monitoring apparatus 10 (Pushed-In State).

Then, as shown in FIG. 3(C), the reference member 22 is moved rearward so as to become close to the proximity sensor 23. The proximity sensor 23 generates a detection signal when the distance to the reference member 22 has decreased to a given distance including zero.

The judging unit 15 will detect an abnormal condition of the floating mechanism 6 for the tested pad 4 based on the detection signal from the proximity sensor 23. Namely, it is detected that the vacuum absorption pad 4 is not elastically supported in a normal state by the floating mechanism 6.

A compressed air is ejected from the fluid ejecting unit 25 toward the end-effector 3 so that the attached fragments of glass are blown off.

Accordingly, a deteriorated floating mechanism 6 may recover its elastically supporting function by means of the cleaning effect by the fluid ejecting unit 25. Therefore, it is preferable that the detection operation by the movement detection unit having the proximity sensor 23 is conducted after conducting an enough cleaning by the fluid ejecting unit 25.

The judgment results by the judging unit 15 are stored in the memory unit 24 together with the information for identifying the tested vacuum absorption pad 4. For example, as shown in FIG. 5, a plurality of vacuum absorption pads 4 are respectively provided with their identification numbers.

Then, the judging unit 15 judges, based on the judgment results stored in the memory unit 24, whether the detected abnormal condition, if any, of a plurality of vacuum absorption pads 4 satisfies a given condition.

Here, the "given condition" is defined as, for example, a state that the end-effector 3 may be unable to hold a glass substrate and drop the same due to slip during transferring the glass substrate. Concretely, it may be the case that all of four pads 4 belonging to the same one row or column have been damaged. Or, it may be the case that a predetermined number of pads 4 among all of the pads 4 have been damaged.

The "given condition" may be classified into a plurality of levels according to the seriousness of the abnormal conditions. Then, in the case that the abnormal condition is non-serious, the transfer robot 1 is operated under an operational speed slower than the normal operational speed so as to continue its transferring operation. On the other hand, in the case that the abnormal condition is serious, the transfer robot 1 is stopped so that the end-effector 3 is repaired.

Figure 6:
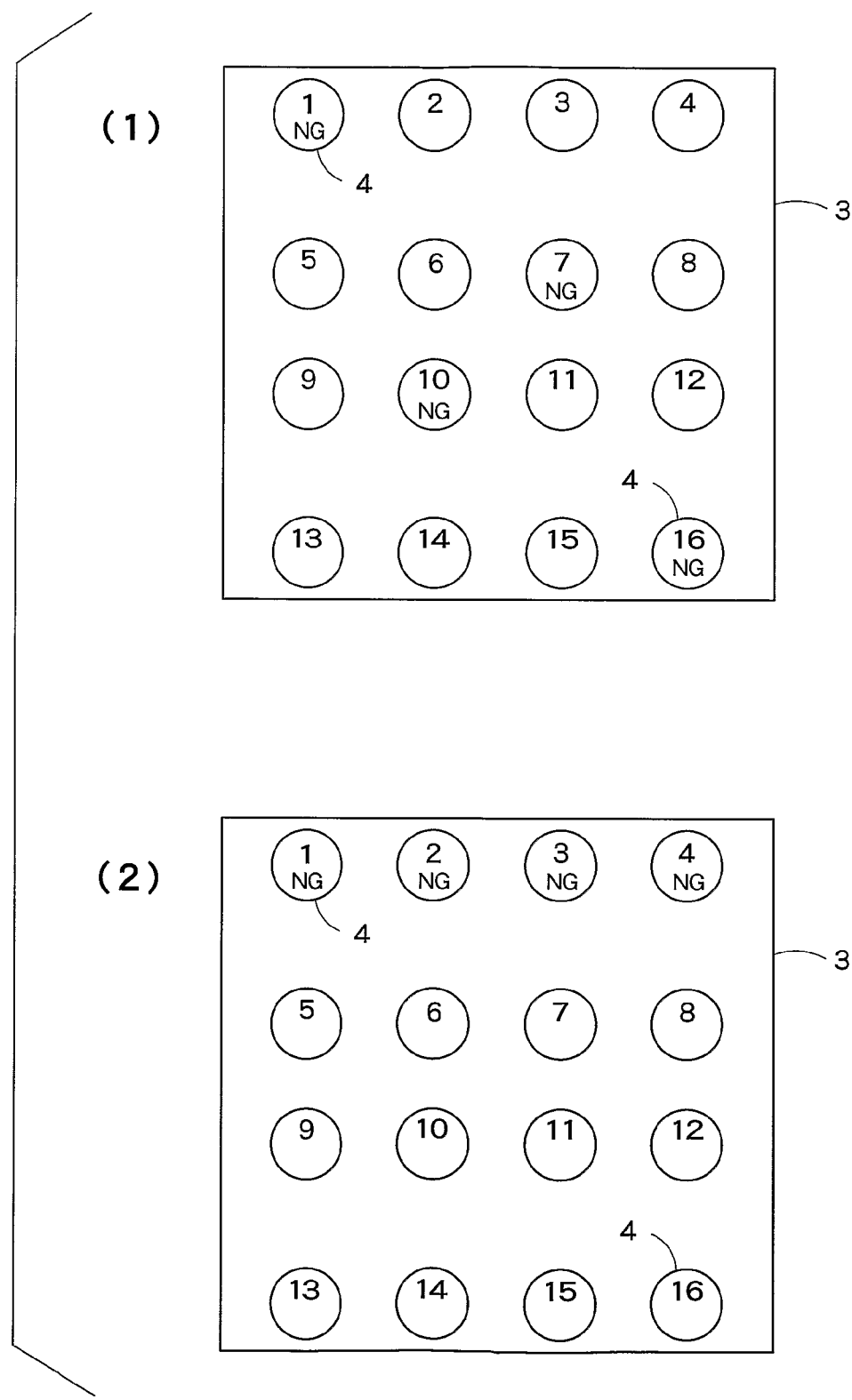
FIG. 6 is a drawing for explaining a method of judging an abnormal condition of the transfer robot by means of the monitoring apparatus according to the present embodiment, in which FIG. 6(1) shows a non-serious abnormal condition, and FIG. 6(2) shows a serious abnormal condition.

For example, in the case shown in FIG. 6(1), although four vacuum absorption pads 4 (No. 1, 7, 10, 16) have been damaged, there is only one abnormal pad 4 among four pads 4 belong to the same row or column.

In such case, it is judged that a glass substrate can be held by the remaining normal pads 4 so that the transferring operation of glass substrates is continued. In this case, the transfer robot 1 may be operated under an operational speed which is slower than the normal operational speed.

On the other hand, in the case shown in FIG. 6(2) that all of the four vacuum absorption pads 4 (No. 1, 2, 3, 4) belonging to the same row, i.e., the uppermost row, have been damaged, the uniformity of absorbing force for an overall glass substrate is greatly deteriorated, although the number of abnormal pads 4 is the same as that of the case shown in FIG. 6(1).

Therefore, in the case shown in FIG. 6(2), it is judged that a glass substrate can not be safely held so that the transfer robot 1 should be stopped for maintenance.

The number and arrangement of the vacuum absorption pads 4 mounted on the end-effector 3 of the transfer robot 1 can be changed in accordance with the size and weight of the article to be transferred. Therefore, the above-mentioned "given condition" used for judging abnormal conditions of the end-effector 3 by the monitoring apparatus 10 of the present embodiment can be changed in accordance with the number and arrangement of the vacuum absorption pads 4 mounted on the end-effector 3 of the transfer robot 1.

As described above, according to the monitoring apparatus 10 of the present embodiment, since the end-effector 3 is tested by the monitoring apparatus 10 which is disposed separately from the transfer robot 1, the vacuum sensor 14 of the monitoring apparatus 10 is not likely to be damaged during the transfer operation of substrates, differently from the case that vacuum sensors are mounted on the vacuum absorption pads. Further, unnecessary stop of the transfer robot 1 due to erroneous operations of vacuum sensors can be prevented.

Moreover, according to the monitoring apparatus 10 of the present embodiment, the conditions of the vacuum absorption pads 4 of the end-effector 3 can be easily and surely detected. Particularly, not only the abnormal conditions of vacuum absorbing forces of the vacuum absorption pads 4, but also the elastically supporting conditions of the vacuum absorption pads 4 by the floating mechanisms 6 can be detected.

Furthermore, according to the monitoring apparatus 10 of the present invention, the judgment results about the abnormal conditions of the respective vacuum absorption pads 4 are stored in the memory unit 24, and the judging unit 15 judges whether the abnormal condition of a plurality of vacuum absorption pads 4 satisfies the given condition. Therefore, the point of time when the transfer robot 1 has become unable to safely transfer glass substrates can be precisely detected.

Although the invention has been described in its preferred embodiment with a certain degree of particularity, obviously many changes and variations are possible thereon. It is therefore to be understood that the present invention can be practiced otherwise than as specifically described herein without departing from the scope and spirit thereof.

The invention claimed is:

1. A monitoring apparatus for monitoring a condition of an end-effector of a robot, the robot including a vacuum absorption pad to hold an article, the pad being configured to be elastically supported by the end-effector, comprising:
    a pad receiving part having a front surface and a through hole, the pad receiving part being configured to be movable in a direction perpendicular to the front surface;
    an elastically supporting unit configured to elastically support the pad receiving part in a direction perpendicular to the front surface;
    a movement detection unit configured to detect a movement of the pad receiving part;
    a vacuum sensor connected to the through hole; and
    a judging unit configured to judge a condition of an elastic support of the pad and a condition of a vacuum absorption of the pad based on a detection result of the movement detection unit and a detection result of the vacuum sensor.

2. The monitoring apparatus for the robot according to claim 1, wherein the movement detection unit is configured to generate a detection signal when an amount of the movement of the pad receiving part has reached a given value in a state that the vacuum absorption pad is pressed against the front surface.

3. The monitoring apparatus for the robot according to claim 2, wherein the movement detection unit includes a proximity sensor which is disposed opposite to a reference member to be detected by the proximity sensor, the reference member being configured to move together with the pad receiving part toward the proximity sensor.

4. The monitoring apparatus for the robot according to claim 1, wherein the elastically supporting unit is configured to elastically support the pad receiving part with an elastically supporting force which is greater than an elastically supporting force for supporting the vacuum absorption pad in the end-effector.

5. The monitoring apparatus for the robot according to claim 1, wherein the elastically supporting unit comprises a liner guide configured to support the pad receiving part so that the pad receiving part can move in back-and-forth directions, and a compressing spring configured to press a movable member, to which the pad receiving part is attached, of the liner guide in a direction perpendicular to the front surface.

6. The monitoring apparatus for the robot according to claim 1, wherein the robot includes a plurality of vacuum absorption pads,
   wherein the monitoring apparatus further comprises a memory unit in which judgment results by the judging unit are stored together with an information for identifying respective vacuum absorption pads.

7. The monitoring apparatus for the robot according to claim 6, wherein the judging unit is configured to judge based on the judgment results stored in the memory unit whether an abnormal condition of the plurality of vacuum absorption pads satisfies a given condition.

8. The monitoring apparatus for the robot according to claim 7, wherein the given condition includes a condition corresponding to a serious abnormal state in which the article can not be transferred, and a condition corresponding to a non-serious abnormal state in which the article can be transferred but under a transferring speed lower than a normal transferring speed.

9. The monitoring apparatus for the robot according to claim 1, further comprises a fluid ejecting unit configured to eject a compressed fluid toward the end-effector.

\* \* \* \* \*